United States Patent
Herman et al.

(10) Patent No.: US 10,836,356 B2
(45) Date of Patent: Nov. 17, 2020

(54) SENSOR DIRTINESS DETECTION

(71) Applicant: Ford Global Technologies, LLC, Dearborn, MI (US)

(72) Inventors: David Michael Herman, Oak Park, MI (US); Venkatesh Krishnan, Canton, MI (US); Sunil Patil, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 140 days.

(21) Appl. No.: 16/136,631

(22) Filed: Sep. 20, 2018

(65) Prior Publication Data
US 2020/0094785 A1    Mar. 26, 2020

(51) Int. Cl.
| | |
|---|---|
| *B60S 1/08* | (2006.01) |
| *B60S 1/48* | (2006.01) |
| *G06K 9/62* | (2006.01) |
| *G06T 7/73* | (2017.01) |
| *G06K 9/32* | (2006.01) |
| *G02B 27/00* | (2006.01) |

(52) U.S. Cl.
CPC ............ *B60S 1/0848* (2013.01); *B60S 1/485* (2013.01); *G06K 9/3233* (2013.01); *G06K 9/6211* (2013.01); *G06T 7/74* (2017.01); *G02B 27/0006* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 6,198,852 B1* | 3/2001 | Anandan | G06K 9/209 345/419 |
| 7,609,857 B2 | 10/2009 | Franz | |
| 8,553,088 B2 | 10/2013 | Stein et al. | |
| 8,797,417 B2 | 8/2014 | Gayko et al. | |
| 8,861,780 B2 | 10/2014 | Heenan et al. | |
| 9,126,534 B2 | 9/2015 | Snider | |
| 9,185,360 B2 | 11/2015 | Stein et al. | |
| 9,224,055 B2 | 12/2015 | Kido | |
| 9,445,057 B2 | 9/2016 | May et al. | |
| 9,607,242 B2 | 3/2017 | Lavoie | |

(Continued)

FOREIGN PATENT DOCUMENTS

| | | | |
|---|---|---|---|
| CN | 107605537 A | 1/2018 | |
| DE | 4128039 A1 * | 2/1993 | G01W 1/14 |

(Continued)

OTHER PUBLICATIONS

Zoox Fully Autonomous Driving—YouTube, published Jul. 20, 2018, retrieved from Internet URL: https://www.youtube.com/watch?v=868tExoVdQw&feature=youtu.be&t=177 (3 pages).

(Continued)

*Primary Examiner* — Kim Y Vu
*Assistant Examiner* — Nathan J Bloom
(74) *Attorney, Agent, or Firm* — Frank A. MacKenzie; Bejin Bieneman PLC

(57) ABSTRACT

An occluded area on a vehicle sensor is identified by localizing the vehicle in space. A discrepancy between historic image data and real-time image data from the sensor is determined, and a cleaning actuator is actuated based on the determined discrepancy.

18 Claims, 10 Drawing Sheets

(56) References Cited

U.S. PATENT DOCUMENTS

| | | | |
|---|---|---|---|
| 9,804,386 B2 | 10/2017 | Hayakawa et al. | |
| 2008/0079835 A1* | 4/2008 | Lin | G03B 5/00 348/335 |
| 2012/0026326 A1* | 2/2012 | Itoh | H04N 7/181 348/143 |
| 2015/0088374 A1* | 3/2015 | Yopp | B60S 1/04 701/36 |
| 2015/0310274 A1* | 10/2015 | Shreve | G06T 7/20 382/103 |
| 2015/0356371 A1* | 12/2015 | Libal | G06F 17/142 348/311 |
| 2017/0076463 A1* | 3/2017 | Nishijima | H04N 13/111 |
| 2017/0109590 A1 | 4/2017 | Gehrke | |
| 2017/0253201 A1* | 9/2017 | Maeshiro | G06K 9/00791 |
| 2018/0200745 A1* | 7/2018 | Dudar | B05B 12/10 |
| 2018/0334140 A1* | 11/2018 | Ghannam | B60S 1/0848 |
| 2018/0341270 A1* | 11/2018 | Dudar | G06Q 10/04 |
| 2019/0064810 A1* | 2/2019 | Jiang | G05D 1/0055 |

FOREIGN PATENT DOCUMENTS

| | | |
|---|---|---|
| DE | 10322087 A1 | 12/2004 |
| WO | 2010038223 A1 | 4/2010 |
| WO | 2017153372 A1 | 9/2017 |

OTHER PUBLICATIONS

Zhang, et. al., "Self-Detection of Optical Contamination or Occlusion in Vehicle Vision Systems" Optical Engineering 47 (6), Jun. 2008, retrieved from URL: DOI:10.1117/1.2947578 (4 pages).

Megahed, et. al., "A Review and Perspective on Control Charting with Image Data", Journal of Quality Technology, A Quarterly Journal of Methods, Applications and Related Topics, 43:2, pp. 83-98 (17 pages).

Everingham, et. al., "The Pascal Visual Object Classes Challenge—A Retrospective", International Journal of Computer Vision, Jan. 2015, 111(1), pp. 98-136 (39 pages).

Dodge, et. al., "Understanding How Image Quality Affects Deep Neural Networks", retrieved from Internet URL: https://arxiv.org/pdf/1604.04004.pdf (6 pages).

Cordts, et. al., "The Cityscapes Datasets for Semantic Urban Scene Understanding", retrieved from Internet URL: www.cityscapes-dataset.net, pp. 3213-3223 (11 pages).

\* cited by examiner

FIG. 12

SENSOR DIRTINESS DETECTION

BACKGROUND

Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway. A vehicle may include one or more optical or image sensors such as camera sensors. Typically, such sensors include transparent surfaces, e.g., lenses, to protect an imaging sensor viewing an area outside of the vehicle and/or to focus incoming light beams on the imaging sensor. A transparent surface such as a camera lens is typically subject to environmental conditions, e.g., dust, insect impact, smudge, rain, fog, etc., that can impair visibility of the vehicle exterior. Further, an optical property of a transparent surface such as a lens may change due to degradation or damage, e.g., scratching, pitting, etc.

BRIEF DESCRIPTION OF THE DRAWINGS

FIG. 12 shows an example confusion matrix.

DETAILED DESCRIPTION

Introduction

Figure 1:
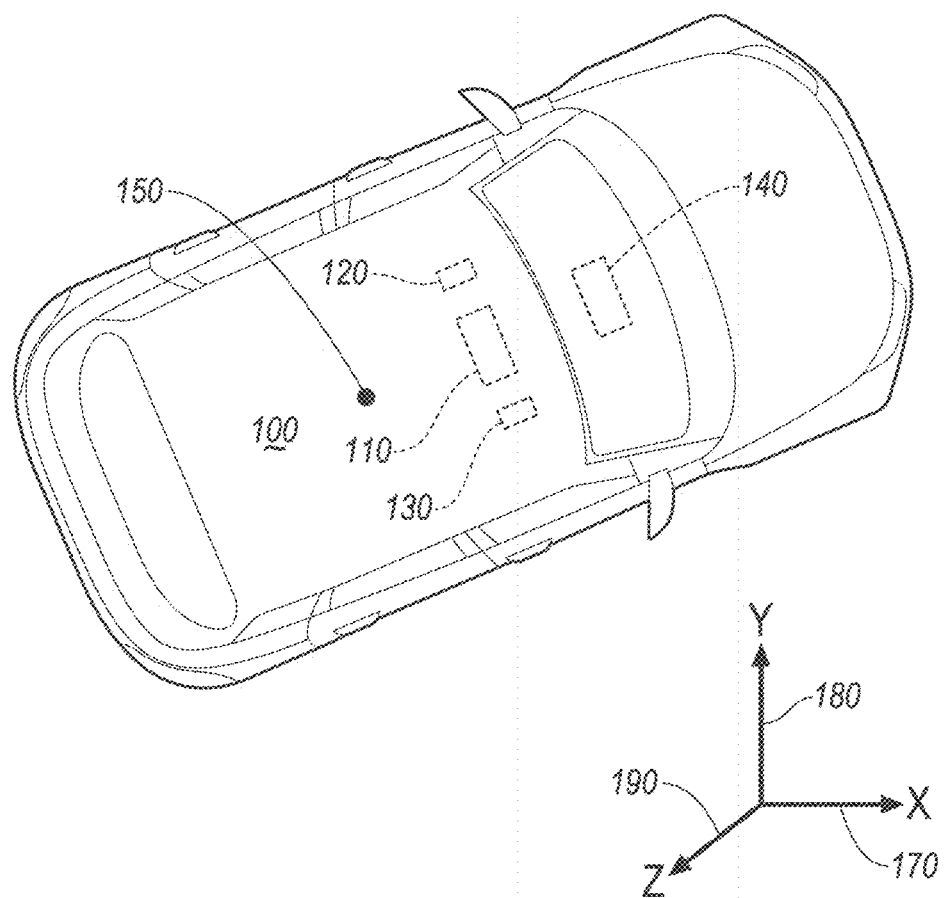
FIG. 1 is a block diagram illustrating an example vehicle.

Disclosed herein is a method including identifying an occluded area on a vehicle sensor by localizing the vehicle in space, determining a discrepancy between historic image data and real-time image data from the sensor, and actuating a cleaning actuator based on the determined discrepancy.

The historic image data may be based on data from at least on one of a second vehicle and a second sensor of the vehicle.

The historic image data may include 3D location coordinates.

The historic image data may include a classification for each point or a plurality of points, the method further comprising determining the discrepancy based at least in part on the classification of a point included in the real-time image data.

The classification may be at least one of a flat surface, a human, a vehicle, a construction, an object, a nature, and a sky class.

Determining the discrepancy may further include performing a perspective transformation of historic image data based on vehicle location coordinates and the vehicle orientation, identifying first feature points in the real-time image data and second feature points in the historic image data, performing a homography that includes a line-preserving projective mapping for the first and second feature points, and identifying a first portion of the real-time image data matching a second portion of the historic image data.

The method may further include identifying a classification of each feature in the historic image data, selecting static features based on the classification of the features, determining false positive and true positive classifications of the static features based on the real-time image data, and determine the discrepancy based on the determined true positive and false classifications and a confusion matrix including an average expected rate of misclassification for each class of features.

The method may further include determining a local discrepancy value for a location on a transparency of the sensor and a global discrepancy value for the transparency, and actuating the cleaning actuator upon determining that a difference between an average of the local discrepancy and the global discrepancy exceeds a threshold.

The static feature may be a feature of at least one of a flat, construction, and object classes.

Further disclosed herein is a system including a processor and a memory. The memory stores instructions executable by the processor to identify an occluded area on a vehicle sensor by localizing the vehicle in space, to determine a discrepancy between historic image data and real-time image data from the sensor, and to actuate a cleaning actuator based on the determined discrepancy.

The vehicle sensor may include a camera sensor, and the instructions may further include instructions to identify the occluded area in an optical path of the camera sensor.

The optical path may include at least one of a lens and a transparent exterior cover.

The occluded area may be an area in the optical path of the vehicle sensor that is covered by at least one of fog, water, smudge, dust, and scratch.

The occluded area may be an area of the optical path where an optical attribute of the optical path deviates from a specified optical property. The optical property may include at least one of a focal point and a distortion.

Further disclosed herein is a system including a vehicle camera sensor having an optical path, and a processor programmed to identify an occluded area on the optical path of the camera sensor by localizing the vehicle in space, determine a discrepancy between historic image data and real-time image data from the sensor, and to actuate a cleaning actuator based on the determined discrepancy.

The occluded area may be an area in an optical path of the vehicle sensor that is covered by at least one of fog, water, smudge, dust, and scratch.

The occluded area may be an area of the optical path where an optical attribute of the optical path deviates from a specified optical property. The optical property may include at least one of a focal point and a distortion.

The processor may be further programmed to identify a classification of each feature in the historic image data, to select static features based on the classification of the features, to determine false positive and true positive classifications of the static features based on the real-time image data, and to determine the discrepancy based on the determined true positive and false classifications and a confusion matrix including an average expected rate of misclassification for each class of features.

Further disclosed is a computing device programmed to execute any of the above method steps.

Yet further disclosed is a computer program product, comprising a computer readable medium storing instructions executable by a computer processor, to execute any of the above method steps.

System Elements

An occluded area on a vehicle sensor may be identified by localizing an ego vehicle in space and determining a discrepancy between historic image data and real-time image data from the sensor. A sensor cleaning system may be actuated based on the determined discrepancy. The historic image data may be based on data from a second vehicle and/or a second sensor of the ego vehicle. An occluded area on a vehicle sensor, e.g., on a lens, window, or windshield, may impair an ability of vehicle computer to detect object(s), to determine based on the received sensor data, and therefore, may impair an ability of the vehicle computer to navigate and/or localize the vehicle. Thus, the present system improves vehicle operation by detecting and/or remediating an occluded area of a vehicle sensor transparency, e.g., a lens. In the context of this disclosure, "occluded" with respect to a transparent surface such as a lens means a blockage that prevents or diminishes the passage of light. In the present context, "diminishing the passage of light" means reducing and/or manipulating (e.g., translucence) light while passing through. In the present context, "reducing" means a decrease of light intensity because of passing through the occluded area, e.g., rain drop (or film). Translucence is a physical property of allowing light to pass through a material diffusely. In addition, the blockage may result in a shift in perceived color of the environment from a transparent colored film. Additionally or alternatively, a blockage may result in a blurring of image or a localized distortion.

FIG. 1 shows an example vehicle 100 which may include a computer 110, actuator(s) 120, sensors 130 such as a (Light Detection and Ranging) lidar sensor 130, camera sensor 130, GPS sensor 130, radar sensor 130, camera sensor 130, etc., and a human machine interface (HMI 140). A vehicle 100 may be powered in variety of ways, e.g., including with an electric motor and/or internal combustion engine. A vehicle 100 may include a reference point 150, e.g., an intersection of a vehicle 100 longitudinal and lateral axes (the axes can define respective longitudinal and lateral center lines of the vehicle 100 so that the reference point 150 may be referred to as a vehicle 100 center point). In the present context, a vehicle 100 location refers to location coordinates of the vehicle 100 reference point 150.

FIG. 1 further shows a first coordinate system defined by an X axis 170, Y axis 180, and Z axis 190, e.g., a Cartesian coordinate system, that is independent from the vehicle 100 location and/or orientation. The first coordinate system may be referred to as a "global" coordinate system because it is defined independently of a vehicle 100 and is typically defined for a geographic area, such as the coordinate system of a global positioning system (GPS) that is defined for the world. Alternatively or additionally, the first coordinate system could include any other location coordinate system providing geo-coordinates (i.e., latitude, longitude pairs) or the like.

The computer 110 includes a processor and a memory. The memory includes one or more forms of computer-readable media, and stores instructions executable by the computer 110 for performing various operations, including as disclosed herein.

The computer 110 may operate the vehicle 100 in an autonomous, semi-autonomous, or non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering; in a non-autonomous mode, a human operator controls vehicle propulsion, braking, and steering.

The computer 110 may include programming to operate one or more of vehicle brakes, propulsion (e.g., control of acceleration in the vehicle 100 by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle 100 and/or receive messages from the various devices, e.g., the sensor 130, actuators 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle 100 communication network.

The vehicle 100 actuators 120 may be implemented via circuits, chips, or other electronic components that can actuate various vehicle subsystems in accordance with appropriate control signals as is known. The actuators 120 may be used to control braking, acceleration, and steering of the vehicle 100. As an example, the vehicle 100 computer 110 may output control instructions to control the actuators 120.

In addition, the computer 110 may be programmed to communicate through a wireless communication network with, e.g., a remote computer. The wireless communication network, which may include a Vehicle-to-Vehicle (V-to-V) and/or a Vehicle-to-Infrastructure (V-to-I) communication network, includes one or more structures by which the vehicles 100, the remote computer, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

The vehicle 100 may include one or more sensor(s) 130 that provide data from detecting physical phenomena (e.g., light, sound, electricity, magnetism, etc.) from spaces encompassing at least some of an interior and/or exterior of the vehicle 100. With reference to FIGS. 1 and 2A-2B, a vehicle 100 may include one or more camera object detection sensor(s) 130, e.g., lidar, radar, and/or camera sensor 130. A camera sensor 130 may provide image data from an area within a field of view 290 of the camera sensor 130. A camera sensor 130 may include a housing 210, an image sensor 220, and an optical path 230. The camera sensor 130 may receive light beams from an area within the field of view 290 of the sensor 130 and may generate an electrical signal based on the received light beams, e.g., in a conventional manner. The housing 210 may be formed of plastic, metal, etc., that encloses components of the camera sensor 130. The image sensor 220 may include an electronic receiver, e.g., a charge-coupled device (CCD) or Complementary metal-oxide-semiconductor (CMOS), that receives light beams (or light rays), e.g., light reflected by an object 260, and generates electrical signals based on the received light beams. The optical path 230 may include one or more lenses 240 that are transparent to light beams (e.g., to light beams within a specific wavelength range such as human visible light range) and focus incoming light beams onto the image sensor 220.

Figure 3:
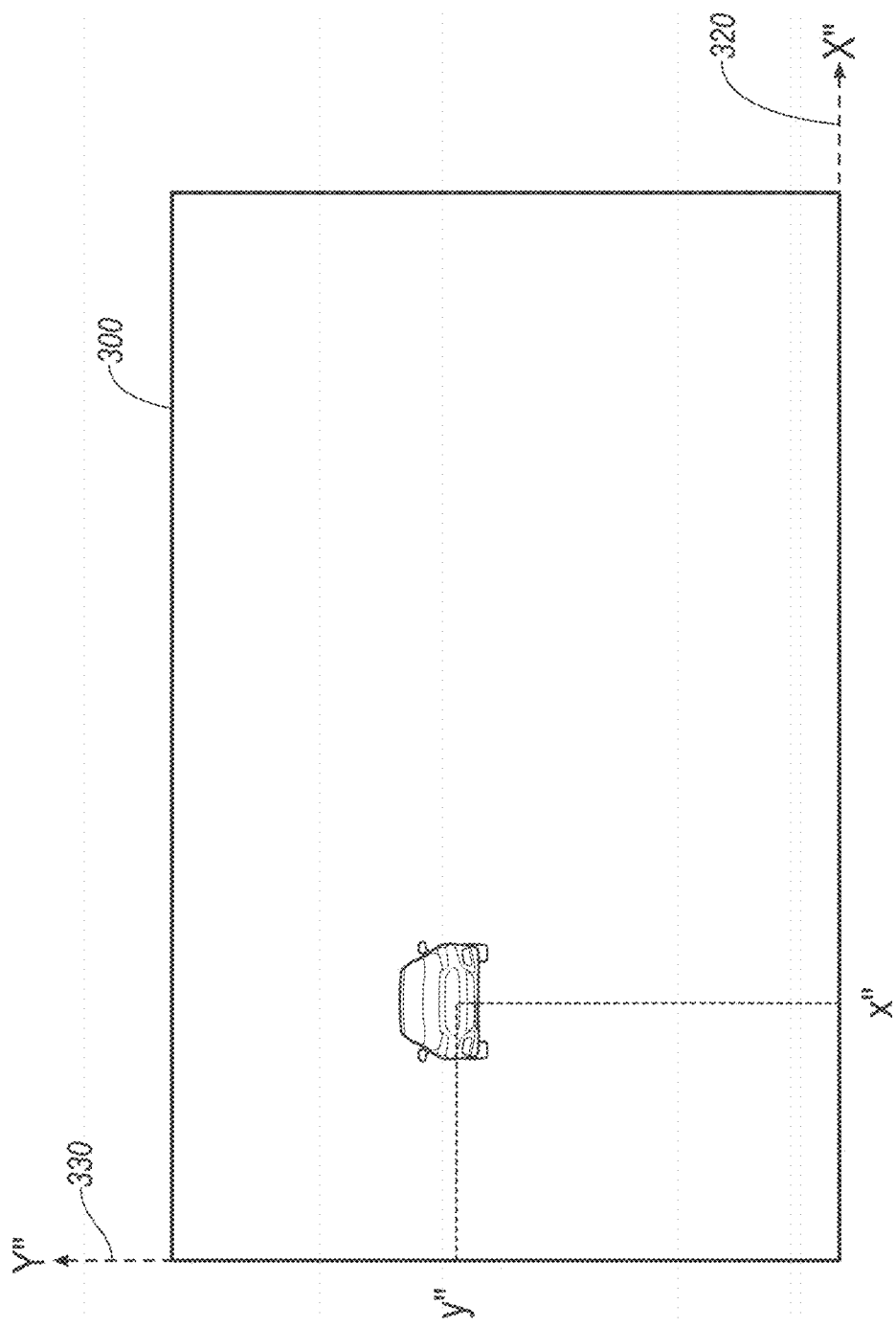
FIG. 3 is an example image received by the vehicle sensor of FIG. 2A.

With reference to FIG. 3, the computer 110 may be programmed to generate an image 300 based on electrical signals from the image sensor 220. An image 300, in the present context, is a digital image that is storable in a computer 110 memory. A digital image may include a plurality of pixels and the image data may include data such as image intensity and/or color associated with each one of the pixels. The lenses 240 may be formed of plastic and/or glass. Further, the optical path 230 may include one or more other transparent components such as a light filter, polarizer, a protection cover, etc. In another example, the optical path 230 may include a portion of a vehicle 100 transparent exterior cover, e.g., a portion of the windshield positioned within a field of view a forward-looking camera sensor 130 mounted behind the vehicle 100 windshield providing image data from an area outside of the vehicle 100. In the present disclosure, "transparency" includes any of transparent components of the optical path 230.

Figure 2:
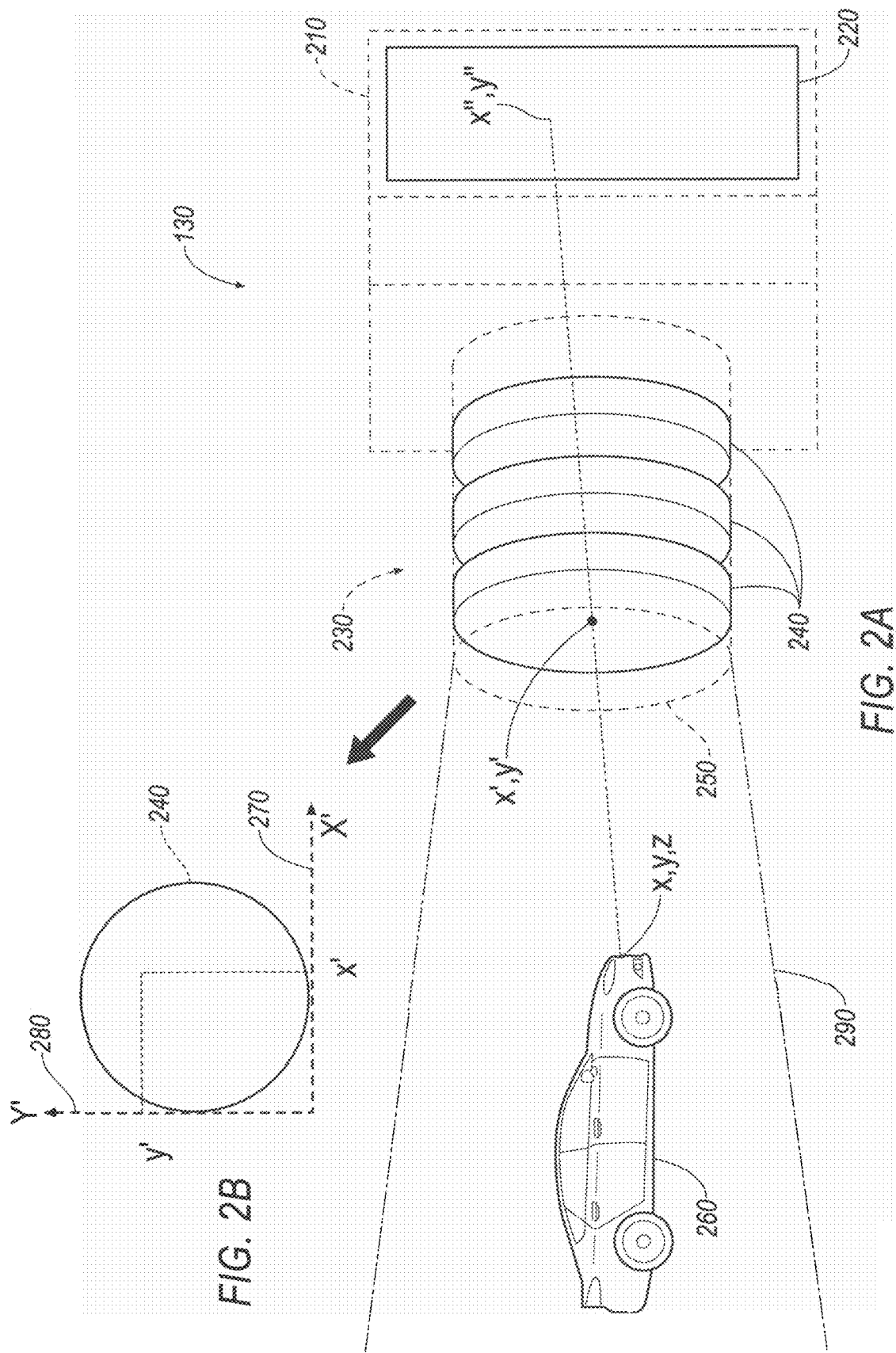
FIG. 2A is a diagram showing an example camera sensor and an object viewed by the vehicle sensor.
FIG. 2B is a diagram showing a front view of a lens of the camera of FIG. 2A.

With reference to FIGS. 1-3, the computer 110 may be programmed to receive, from the camera 130, an image 300 that includes an area within the field of view 290 of the camera 130. FIG. 2B shows a two-dimensional Cartesian coordinate system defined by an X' axis 270 and a Y' axis 280 which specifies coordinates of points on a surface of the lens 240 and/or any transparent component within the optical path 230. FIG. 3 shows an example image 300 received from the camera sensor 130 of FIG. 2A, and a two-dimensional Cartesian coordinates system defined by an X" axis 320 and a Y" axis 330. A light beam originated (e.g., reflected and/or illuminated) from a point x, y, z on the object 260 may pass through a point x', y' of the lens 240 and result in a point (or pixel) with coordinates x", y" in the image 300. The computer 110 may be programmed to identify the location coordinates x', y' based on the location coordinates x", y" and optical attributes of the optical path 230. For example, a lens 240 may cause a distortion of light beams passing through the lens 240, resulting in warping images captured by a camera 130. A distortion attribute of the lens 240 may be specified with a mathematical model, e.g., defined based on a lens 240 specification, e.g., fish-eye effect, barrel effect, etc. The computer 110 may be programmed, based on the mathematical model of the lens 240, to determine the coordinates of a point x', y' based on the coordinates x", y" in the image 300.

If the point specified by coordinates x', y' on the transparency of the sensor 130 is partially or fully blocked, e.g., by a smudge, fog, etc., the image data for the pixel x", y" of the camera sensor 130 may be incorrect (i.e., may not reflect the light beams received from the point x, y, z). This may result in a misclassification of the object 260 by a computer 110 that is programmed to detect objects 260 based on the image data received from the camera sensor 130.

With reference to FIG. 1, the HMI 140 may be configured to receive information from a user during operation of the vehicle 100. Moreover, a HMI 140 may be configured to present information to the user. Thus, a HMI 140 may be located in the passenger compartment of the vehicle 100. In one example, the computer 110 may be programmed to output a message to the HMI 140 indicating that the optical path 230 is fully or partially occluded, e.g., because of rain, smudge, fog, etc. and/or degrading of sensor 130 components such as the lens 240, etc.

Figure 4:
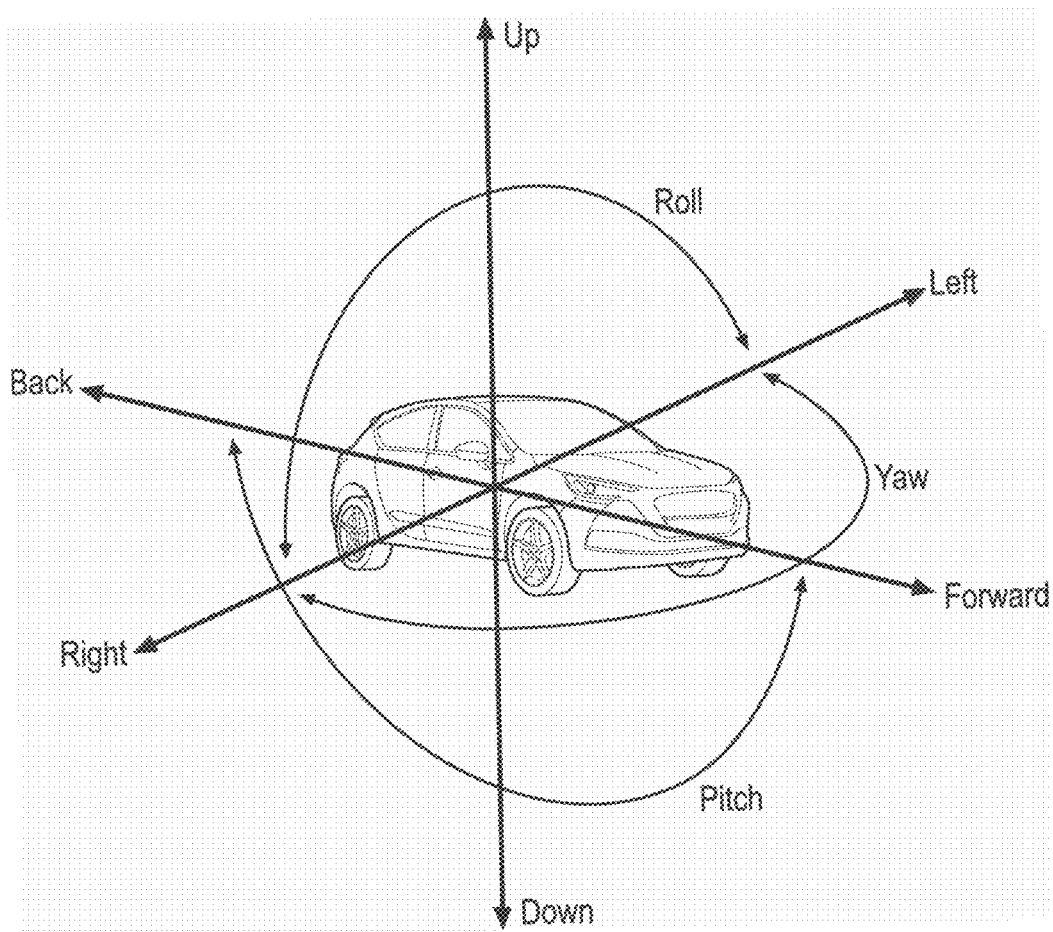
FIG. 4 is a perspective view of the vehicle of FIG. 1 with example orientation vectors superimposed thereon.

With reference to FIG. 4, the vehicle 100 may include an orientation sensor 130 that provides data indicating a current roll, pitch, yaw, and/or vertical position of the vehicle 100. An orientation sensor 130, e.g., an inertial measurement unit (IMU), is an electronic device that measures an orientation of a body (e.g., a vehicle 100 body) using a combination of accelerometers, gyroscopes, and/or magnetometers. An orientation of the vehicle 100 to a reference such as ground level includes a scalar three-dimensional vector with a specified origin, e.g., at the vehicle 100 reference point 150, indicating a direction of the vehicle 100 relative to a reference three-dimensional coordinates system, e.g., the global coordinate system discussed above. For example, the orientation may include an algebraic sum, such as is known, of various independent vectors, each indicating a direction of the vehicle relative to a respective reference direction, e.g., a pitch, a yaw, and a roll of the vehicle 100. Additionally or alternatively, the orientation may include a three-dimensional vector including longitudinal, lateral, and vertical x, y, z coordinates with reference to the X, Y, Z axes 170, 180, 190.

Figure 5:
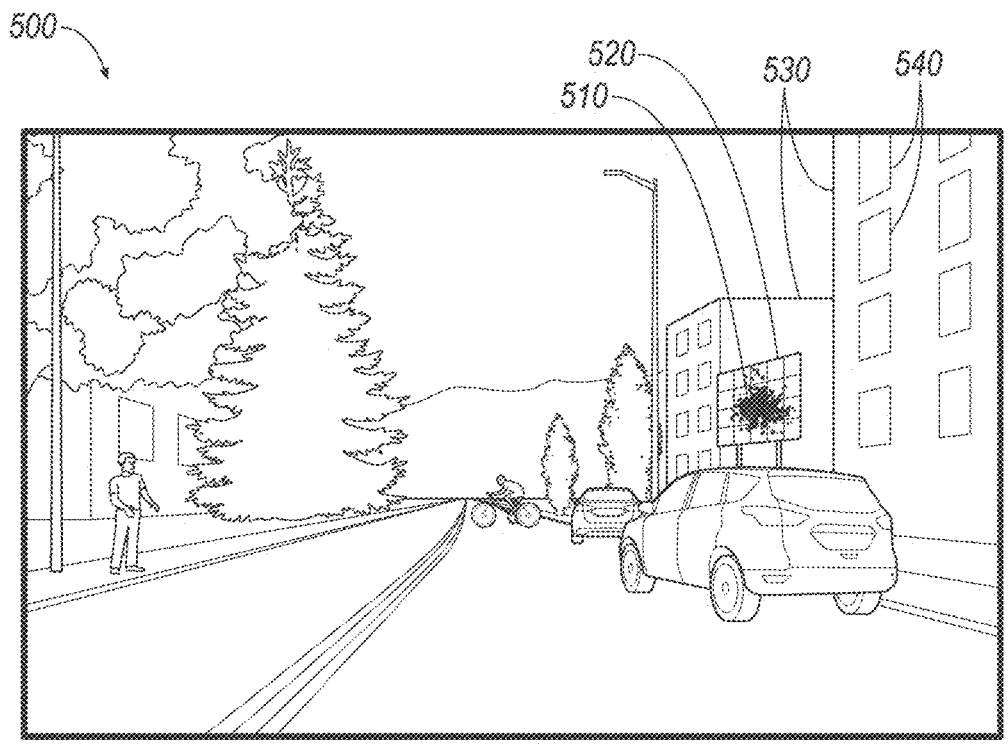
FIG. 5 shows an example image received from a camera sensor having an occluded area on a sensor transparency.

FIG. 5 shows an example real-time image 500 received from a vehicle 100 camera sensor 130 that has an occluded area 510, e.g., a smudge, water, dust, scratch, insect impact, etc., on the sensor 130 transparency, e.g., a lens 240, windshield, etc. Additionally or alternatively, an occluded area 510 may be an area of the optical path 230, e.g., in and/or on the lens 240, the windshield, etc., where an optical attribute of the optical path 230 deviates from a specified optical attribute. The optical attribute (or optical property) may be a focal point, a lens 240 distortion model parameter, etc. A deviation of an optical attribute may be a result of aging of the glass and/or plastic, physical damage, e.g., a scratch, a degradation of a physical component, e.g., glue, of the optical path 230 that causes a misalignment and/or out of focus conditions of the optical path 230. A deviation of an optical attribute may be a result of environmental conditions such as a change in temperature, humidity, vibration, etc. An occluded area 510 may be a result of a full or partial blockage. In one example, a partial blockage is a result of a translucent material such as fog, rain, etc. that allows a partial passing of light while diffusing the light. In another example, a full blockage may be a result of, e.g., smudge, bug impact, etc.

Figure 6:
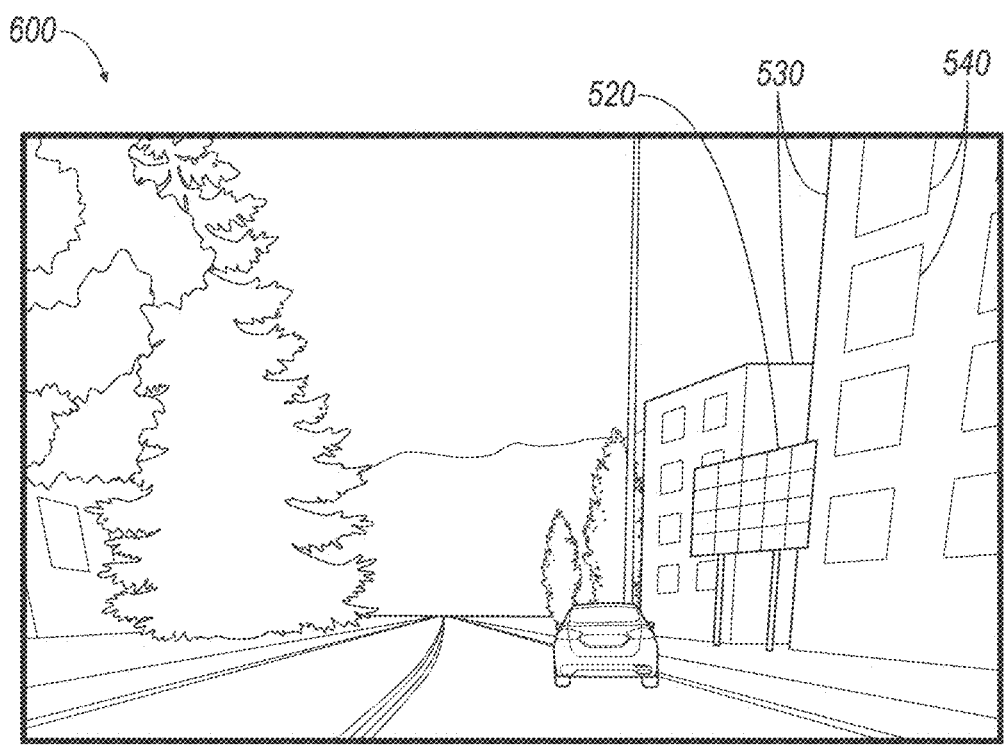
FIG. 6 shows an example historic image data of an area of FIG. 5 from a different perspective.

FIG. 6 shows a historic image 600 at a same location of receiving the real-time image 500 from the vehicle 100 sensor 130. The historic image data (or historical map image data or historical map data) include a collection of image data associated to a geographical area, e.g., collected by a mapping vehicle including camera sensor 130, location sensors 130. A geographical area (or simply area) in the context of this disclosure means a two-dimensional area on the surface of the earth. An area may have any dimensions and/or shape, e.g., rectangular, oval, circular, non-geometrical shape, etc. For example, an area may include a neighborhood, a town, an airport, etc. In the present context, a "space" is a three-dimensional (3D) volume, e.g., above a geographical area that is thereby a bottom of the space. Thus, a space can include buildings, objects, etc., within a geographical area. The historic image data may be received from a remote computer, stored in a computer 110 memory, received from a second camera sensor 130 in the vehicle 100, etc.

In the present context, the 'historic image data" (or historic map data or historic map image data) includes image data captured by a second vehicle 100 and received from a second vehicle 100 computer, a second sensor 130 of the vehicle 100 prior to a time of the real-time image data collection. In one example, historic image data, e.g., the image 600, may be collected days, months, etc., before a current time, e.g., by a mapping vehicle. In another example, the historic image 600 data may be collected by a second vehicle 100 in a same location minutes or seconds before the current time and received via vehicle-to-vehicle communications. In yet another example, the historic image 600 data may be collected by a second sensor 130 of the vehicle 100. In yet another example, the historic image 600 data may include data, e.g., image data, lidar data, etc., collected from a second sensor 130 of the vehicle 100 having a second field of view 290 that overlaps with the field of view 290 of the camera sensor 130. Objects in the space may cause occlusions, e.g., a vehicle standing fully or partially in front of a traffic sign may block a view of the traffic sign by the camera sensor 130. The computer 110 may be programmed to detect such an occlusion based on data received from the second camera sensor 130, map data, etc.

TABLE 1

| Class | Sub-classes |
|---|---|
| Flat | Road, sidewalk, parking |
| Human | child, adult |
| Vehicle | Car, train, truck, bus, bicycle, trailer |
| Construction | building, wall, fence, bridge, tunnel |
| Object | Pole, traffic light, traffic sign, cone |
| Nature | Vegetation, terrain, sky, mountain |

Table 1 above shows an example object classification scheme. The historic image 600 data may further include 3D (three dimensional) location coordinates of features included in the image data, e.g., location coordinates x, y, z of points on buildings, bridges, street surface, traffic signs, etc. Further, the historic image 600 data may include a classification (or class) of each portion, e.g., a pixel or a plurality of pixels, of historic image 600 data, e.g., point of the example image 600, as shown in FIG. 6. A classification may be at least one of a flat surface, a human, a vehicle, a construction, an object, and a nature class. With reference to Table 1, each class, e.g., vehicle, may have multiple sub-classes, e.g., car, truck, bus, etc. In one example, the classification of points in the historic images 600 may be generated by an image processing algorithm that identifies the classes based on collected images 600. Additionally or alternatively, a classification may be performed based on other techniques, e.g., continuous numerical regression outputting monocular depth map, etc.

With reference to FIGS. 5-6, the computer 110 can be programmed to identify an occluded area 510 on a vehicle 100 sensor 130 by localizing the vehicle 100 in space, determining a discrepancy between historic image 600 data and real-time image 500 data, and to actuate a cleaning actuator 120 based on the determined discrepancy. Additionally or alternatively, the computer 110 may be programmed to transmit discrepancy data to a remote computer via the wireless communication network. The remote computer may be programmed to update the historic map data (or historic image data) based on the received discrepancy data. Additionally or alternatively, the computer 110 may be programmed to adjust logic of object detection, perception, etc. For example, the computer 110 may be programmed to ignore data received from the sensor 130 and operate the vehicle 100 based on data received, e.g., from a second sensor 130, a remote computer, etc.

In the present context, "localizing" a vehicle 100 includes determining vehicle 100 location coordinates and a vehicle 100 orientation, i.e., a vehicle 100 yaw, roll, and/or pitch. With reference to FIG. 4, the vehicle 100 location coordinates may include longitudinal, lateral, altitude coordinates, e.g., with respect to a global location coordinate system, e.g., GPS location coordinates. The computer 110 may be programmed, based on conventional localization techniques, to determine the location coordinates of the vehicle 100 based on data received from the vehicle 100 camera sensor 130, lidar sensor 130, etc., and the historic image data, e.g., lidar point cloud data, etc.

As discussed above with reference to FIGS. 2A-2B, the occluded area 510 in the image 500 may be a result of a smudge, fog, dust, scratch, etc., on the transparency of the optical path 230. For example, based on point coordinates on a perimeter of the occluded area 510, the computer 110 may be programmed to determine the location coordinates of points on a perimeter of occluded area on the transparency (e.g., with reference to the two-dimensional coordinate system with X', Y' axes 270, 280). Thus, upon determining location coordinates x", y" of the occluded area 510 in the image 500 with respect to X", Y" axes 320, 330, the computer 110 may be programmed to determine the location coordinates of an occluded area on the transparency with respect to X', Y' axes 270, 280, as discussed above with respect to FIGS. 2A-2B.

In the present context, a "discrepancy" is a quantifier for measuring a mismatch of the real-time data compared to the historic data, e.g., a mismatch in identified classes. Additionally, a "discrepancy" may include a quantifier describing differences resulting from computation of the images, e.g. monocular depth map algorithm output. For example, when one or more pixels of the historic image 600 on the traffic sign 520 is identified as a different class, e.g., a building, etc. Thus, the computer 110 may be programmed to determine the discrepancy based at least in part on the classification of a point included in the real-time image data 500, e.g., a point within the occluded area 510 of the image 500. The computer 110 may be programmed to actuate a cleaning actuator 120, e.g., a wiper, a sprayer pump, etc., upon determining that the determined discrepancy exceeds a threshold, as discussed below with reference to FIG. 12.

Figure 7:
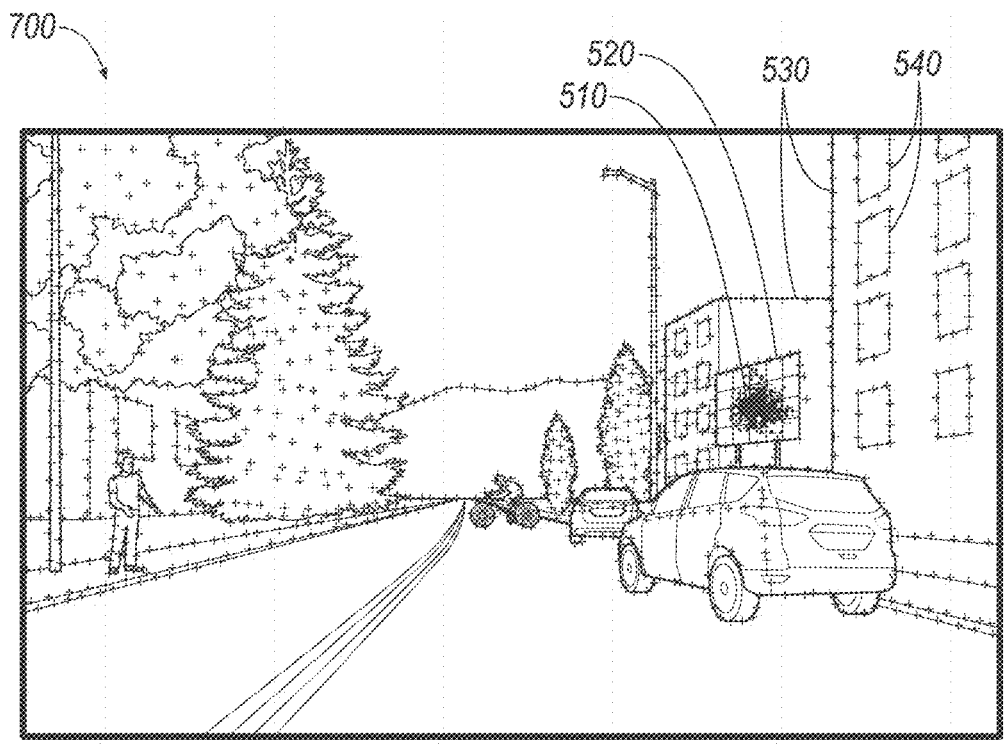
FIG. 7 shows example feature points detected in the real-time image of FIG. 5.
Figure 8:
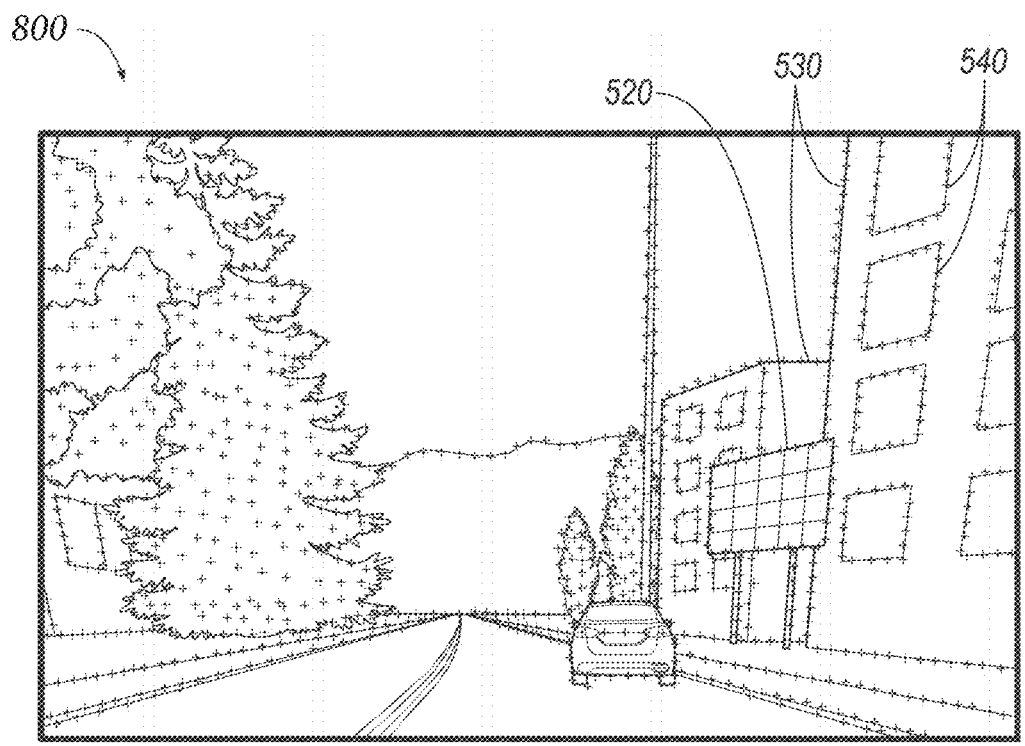
FIG. 8 shows example feature points detected in the historic image of FIG. 6.

With reference to images 700, 800 of FIGS. 7-8, the computer 110 may be programmed based on an image processing technique such as feature registration, to identify the first and second features in the real-time and historic images 500, 600. Each of plus (+) signs shown in the images 700, 800 represent an example feature of images 500, 600. The features may include points, lines, edges, corners, and/or other geometric entities found in the images 500, 600.

In order to determine a discrepancy, the features identified in images 500, 600 may be compared. Thus, the first and second features may be matched prior to identify discrepancies between the images 500, 600. In the present context, "matching" means recognizing a feature identified in image 500 in the image 600 or vice versa. However, the image 600 may be received by the mapping vehicle 100 camera sensor 130, second vehicle 100, and/or the second sensor 130 of the vehicle 100 from a different location and/or orientation. For example, as shown in FIGS. 5-6, a location and/or orientation of an image capturing device, e.g., a second sensor 130 on a mapping vehicle 100 can be different from the location and/or orientation of the vehicle 100 sensor 130 at time of receiving the real-time image 500. This may be a result of a mapping vehicle 100 moving in a different lane of a road compared to the vehicle 100, and/or camera sensor(s) 130 of the mapping vehicle 100, second vehicle 100, or second sensor 130 may be at a different elevation or height from a road surface and/or have a different mounting orientation compared to the orientation of the vehicle 100 sensor 130 with respect to the vehicle 100 reference point 150.

Figures 9A, 9B, 9C:
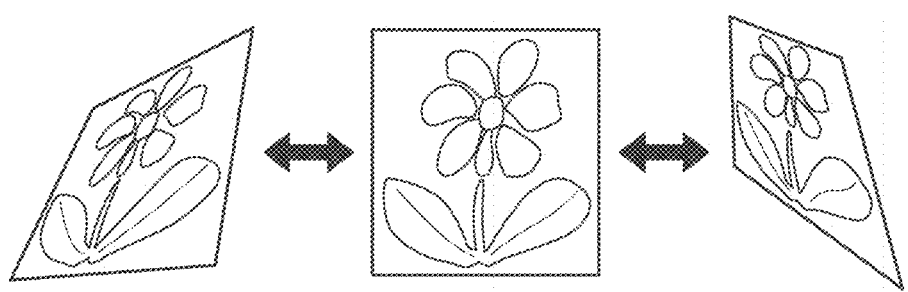
FIGS. 9A-9C show example perspective transformations.

In the present context, "perspective" is a combination of a location and/or orientation of a camera sensor 130. For example, perspectives of the example images 500, 600 of the FIGS. 5 and 6 are different. Thus, in identifying and comparing, e.g., the traffic sign 520 in the images 500, 600 a perspective transformation may be performed. In one example of different perspectives, FIGS. 9A-9C illustrate a flower viewed from different perspectives, e.g., a camera taking an image from three different location and/or orientations relative to the flower. A computer 110 may be programmed to identify feature points of the flower in each of the images 9A-9C and to perform (or compute) a homography or projective transformation to match pixels (or points) of the flower in the FIGS. 9A-9C. As discussed above, the historic image 600 data may lack an image 600 with identical perspective as the real-time image 500. Thus, utilizing a homography technique, the computer 110 may be programmed to identify a projective transformation between the first and second features of the images 500, 600, as discussed below.

The computer 110 may be programmed to identify first feature points in the real-time image 500 data and second feature points in the historic image 600 data, to perform a homography for the first and second feature points, and to identify a first portion of the real-time image 500 data matching a second portion of the historic image 600 data.

In the present context, a "homography" or a "perspective transformation" is a line-preserving projective mapping of points observed from two different perspectives. "Line preserving" means that if multiple points are on a same line in the real-time image 500, the same points are on a same line in the historic map image 600. A homography of the features identified in the images 500, 600 may return a homography matrix that transforms the location coordinates of the feature points. In other words, the homography provides a mathematical relationship between the coordinates of the points of the images 500, 600.

Figure 10:
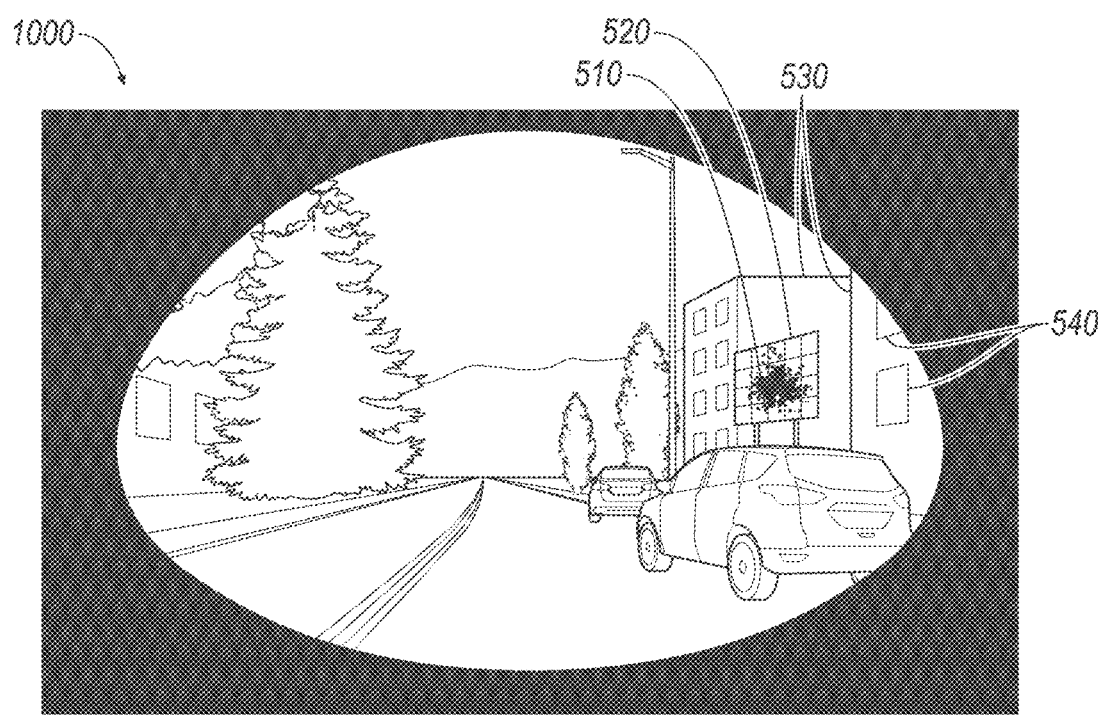
FIG. 10 shows a matched section of real-time image and historic image.

Now turning to FIGS. 7-8, the real-time and historic images 500, 600 may partially overlap with respect to the feature detected in the images 500, 600. For example, some of windows 540 of a building 530 included in the image 500 are missing in the image 600. Thus, with reference to FIG. 10, the computer 110 may be programmed to identify a matched portion 1000 of the real-time image 500 and the historic map image 600 based on the performed homography. A matched portion 1000 includes features for which the computer 110 has identified a homography matrix, i.e., can match based on an identified mathematical mapping. In other words, the matched portion 1000 includes the features which are identified in the real-time image 500 and the historic image 600. FIG. 10 shows only an example of a matched portion 1000. A matched portion 1000 may have any shape based at least on the perspectives of the images 500, 600 relative to one another.

Figure 11:
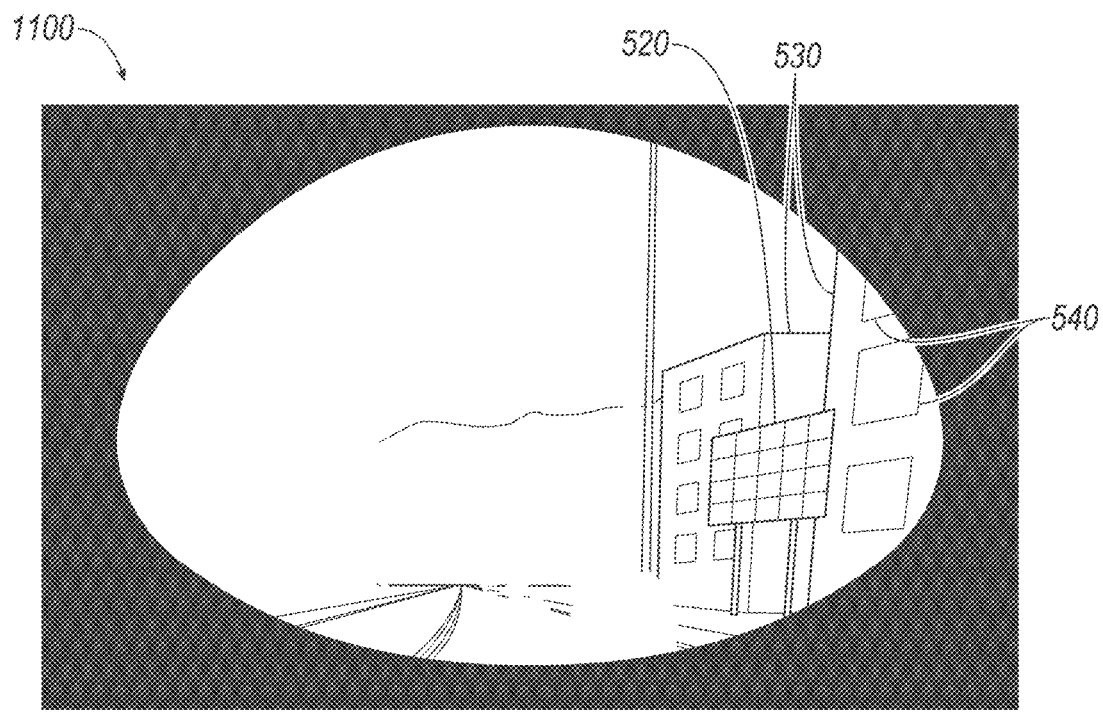
FIG. 11 shows stationary features of the image of FIG. 10.

As discussed above, the computer 110 can be programmed to identify an occluded area 510 based on the discrepancy of real-time image 500 and the historic image 600. However, a discrepancy may result from a moving vehicle, pedestrian, growing vegetation, moving clouds in the sky, etc. In other words, the discrepancy may be a result of an occlusion, e.g., a pedestrian standing in front of a traffic sign. In the present context, "occlusion" is resulted from a feature in the space preventing a viewing of a static feature. In one example, the computer 110 may be programmed to identify static features in the real-time image 500 and to determine the discrepancy based on the static features. In the present context, a static feature is a feature that is not moving, e.g., classified as a flat, construction, and/or object class (see Table 1). Further, a class may include static and/or non-static sub-classes. In one example, a sky sub-class is a non-static sub-class because of changes to vegetation in different seasons, changes to sky because of weather conditions and time of day, etc. In other words, a static feature is a feature that is not expected to move, e.g., a traffic sign 520. For example, FIG. 11 illustrates an example of a matched portion 1100 with static features generated based on the matched portion 1000 of FIG. 10. Non-static features typically change over time, e.g., vegetation changes based on change of seasons, growing, etc.

The computer 110 may be programmed to identify a classification of each feature in the historic image 600 data (based on image processing techniques), to select static features based on the classification of the features, determine "false positive" and "true positive" classifications of the static features based on the real-time image 500 data. In the present context, a "true positive" or "true" classification is determined when the computer 110 identifies a same class for a feature in both real-time and historic map images 500, 600. A "false positive" (or "misclassification" or "misdetection") is determined when the computer 110 identifies different classes for a feature based on the images 500, 600. As discussed above, a location of a feature in an image 500, 600 may be specified with coordinates of one or more pixels in the images 500, 600 with respect to the X" and Y" axes 320, 330. Thus, to determine a true classification or misclassification, the computer 110 may be programmed to compare classes identified with respect to coordinates x", y" of the matched features in either of the images 500, 600.

The computer 110 may be programmed to determine a true classification upon determining that the area of images 500, 600 covered by the traffic sign 520 is identified in the real-time image 500 and the historic image 600 to have a class "object" and a sub-class "traffic sign," as discussed above with reference to Table 1. The computer 110 determines a misclassification or false positive, upon determining a class different than "object" and/or a sub-class different than the "traffic sign" sub-class.

The computer 110 may be programmed to determine "false positive" or "true positive" detections based on static features, i.e., ignoring the features with a class that is determined to be non-static, as shown in FIG. 11. In one example, assuming the historic image 600 data to be more reliable to make such determination compared to real-time image 500 data, the computer 110 may be programmed to identify the static features based on the historic map image 600 and to ignore the areas (or pixels) of the image 500 which based on image 600 included non-static features.

As discussed above, in one example, the historic image 600 data may include classification data of the features included in the images 600. Thus, a "false positive" may be determined upon determining that the computer 110 identifies a class for a feature in the image 500 that is different from the classification stored in the historic map image 600 data for the respective feature. In another example, the computer 110 may be programmed to identify a class for the features in the real-time and historic map images 500, 600. Thus, a misclassification or false positive is determined when results of classifications of a feature in the images 500 and 600 are different.

The computer 110 may be programmed to determine the discrepancy based on the determined true classifications and/or misclassifications. In one example, the computer 110 may be programmed to determine the discrepancy based on (i) the determined true classifications and misclassifications, and (ii) a confusion matrix 1200 (see FIG. 12) including an average expected rate of misclassification for each class of features.

A confusion matrix, in the present context, is a matrix including a statistic, e.g., a percentage, of true classifications and misclassifications of various types of features in normal operating conditions. Normal conditions, in the present context, mean that substantially no occluded area 510 is present on the transparency of the camera sensor 130 and misclassifications are results of other factors such as a weather condition, ambient light condition, optical attribute of the optical path 230, precision and recall of image processing technique, etc. In the present context, "precision" is a fraction of relevant instances among retrieved instances, while "recall" is a fraction of relevant instances that have been retrieved over a total amount of relevant instances. In the present context, a statistic of classification in the confusion matrix 1200 means a rate of a detection of a specific feature, e.g., performing a classification by image processing a specified number of times, e.g., 1000 times, on various image 500 data and determining a number of times that the car was classified as a car or any other type of feature. This may be performed in a lab and the resulting confusion matrix may be stored in form of a table in a memory of the computer 110 and treated as a nominal performance of the system without obstructions, e.g., the occluded area(s) 510. Individual pixels, sub-regions, and/or whole image confusion matrices 1200 may be used for detecting occluded areas 510. In addition to confusion matrix 1200 or alternatively, the computer 110 may be programmed to determine discrepancies based on other techniques, e.g., Jaccard Index, commonly known as PASCAL VOC intersection-over-union metric. The Jaccard Index is a statistical method for comparing a similarity and a diversity of sample sets.

Figure 12:
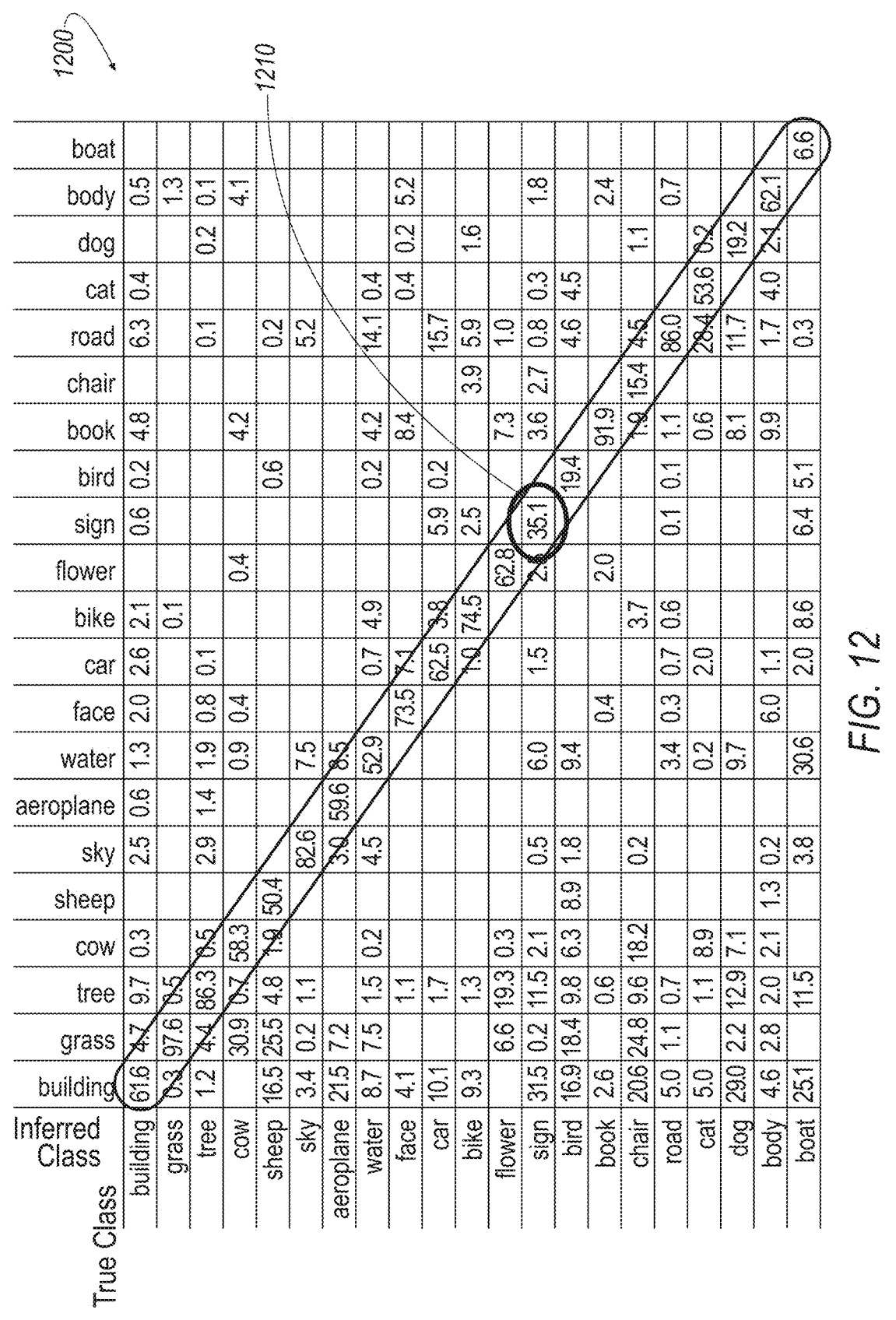

FIG. 12 shows an example confusion matrix 1200. Each row of the example confusion matrix 1200 shows a true class of a feature, whereas each column of the matrix 1200 shows a classification result based on real-time image 500 data. Thus, the statistic shown in the main diagonal of the matrix 1200 represents true classifications, i.e., a classification of real-time image 500 is the same as true classification based on historic map image 600 data. For example, an entry 1210 of the matrix 1200 shows a true classification statistic of 35.1% for detecting traffic signs, e.g., the traffic sign 520 of image 500. Further, entries outside the main diagonal of the matrix show a misclassification of features. For example, the matrix 1200 shows a statistic of misclassification of traffic signs as cars (i.e., classifying a traffic sign 520 as a car) to be 5.9%.

Continuing to refer to the example confusion matrix 1200, a misclassification of a feature may be expected, i.e., even based on image 500 data received from a camera sensor 130 lacking an occluded area 510, misclassifications may be expected. Thus, the computer 110 may be programmed to determine the discrepancy, in the present context, based on a deviation of true classification from an expected static as included in a confusion matrix 1200. For example, the computer 110 may be programmed to determine whether the two distributions (i.e., confusion matrix 1200 and distributions calculated by the computer 110 based on true classifications and misclassifications) are significantly different using techniques such as Z-test, Chi-Squared, etc. In one example, the computer 110 may be programmed to determine no occluded area present at a location of transparency of the optical path 230, at which the traffic sign 520 is viewed, upon determining that the traffic sign 520 is classified in 33% of times with a traffic sign class.

In another example, the computer 110 may be programmed to determine an occluded area 510 at a location of transparency, at which the traffic sign 520 is viewed, upon determining that the traffic sign 520 is classified in a rate that is at least 10% lower than expected true detection rate (e.g., a true detection rate of 15% which is more than 10% lower than 35.1%, i.e., a reduction in true classification exceeding a threshold of 10%).

In present context, a statistic of classification of features in the real-time images 500, is a rate, e.g., specified as a percentage, of a classification compared to a number of classifications, e.g., based on multiple images 500 captured while the vehicle 100 views, e.g., the traffic sin 520, and/or multiple detections including detection of the traffic sign 520 in multiple days because the vehicle 100 often passes same location and views the same traffic sign 520 at a same location of the transparency of the camera sensor 130. For example, a percentage rate may specify a number of true classifications to a total number of classifications (i.e., true classifications and misclassifications). Additionally or alternatively, the computer 110 may be programmed to determine the discrepancy based on various types of classes and to determine a running average discrepancy based on type of the identified classes (i.e., each sample discrepancy determined based on expected true classification statistic for the respective class).

As discussed above, the confusion matrix 1200 includes a statistic of true or false classification of features. Under a temporary condition, e.g., extremely low ambient condition, a rate of true detection of a feature in the image 500 may be temporarily lower than a threshold, although there may not be an occluded area 510 on the transparency of the camera sensor 130. In one example, to improve a detection of an occluded area 510, the computer 110 may be programmed to determine a local discrepancy value for a location on a transparency of the sensor 130 and a global discrepancy value for the transparency, and to actuate the cleaning actuator 120 upon determining that a difference between an average of the local discrepancy and the global discordancy exceeds a threshold.

For example, the computer 110 may be programmed to determine a local discrepancy to be a discrepancy of each pixel of the image (i.e., corresponding to specific point(s) of the transparency as discussed with reference to FIGS. 2-3), and to determine the global discrepancy value to be an average of local discrepancy values determines for entire surface of the transparency of the sensor 130. In one example, the computer 110 may be programmed to actuate the cleaning actuator 120 upon determining that a difference of at least a local discrepancy value and the global discrepancy value exceeds 10%.

Figure 13:
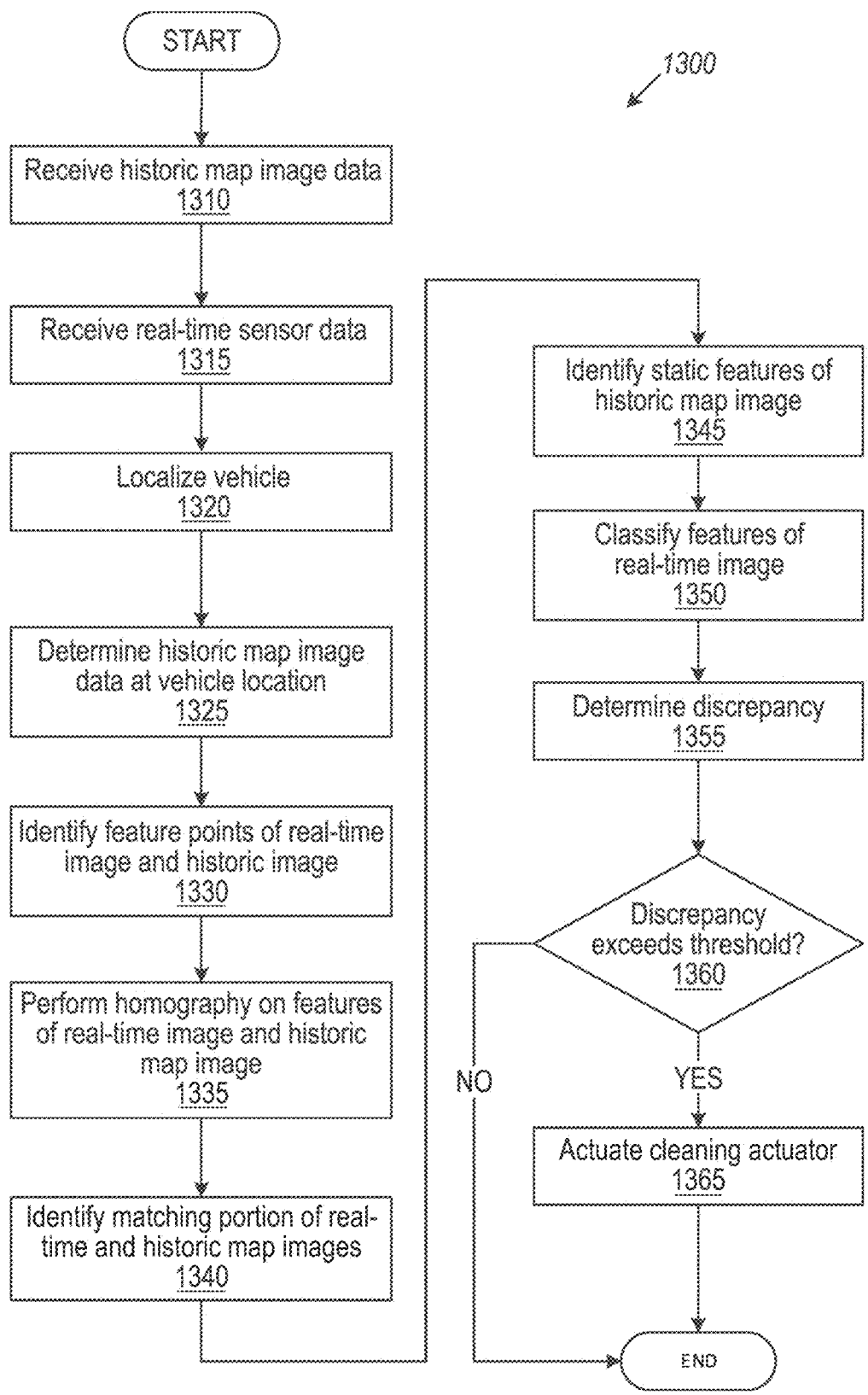
FIG. 13 is a flowchart diagram of an example process to detect occluded areas of vehicle sensor(s) and to operate the vehicle.

FIG. 13 shows an example process 1300 for operating a vehicle 100 cleaning actuator 120. The computer 110 may be programmed to execute blocks of the process 1300.

The process 1300 begins in a block 1310, in which the computer 110 receives historic map image 600 data a geographical area including a current geographical location of the vehicle 100. Additionally, the historic map image data may further include classification of feature points in the images 600.

Next, in a block 1315, the computer 110 receives real-time sensor 130 data. The computer 110 may be programmed to receive image 600 data from a vehicle 100 camera sensor 130. Further, the computer 110 may be programmed to receive data from a GPS sensor 130, an object detection sensor 130 such as a lidar, radar sensor 130, etc.

Next, in a block 1320, the computer 110 localizes the vehicle 100. The computer 110 may be programmed to determine location coordinates and/or the orientation of the vehicle 100 based on received sensor 130 data and the received historic map image 600 data.

Next, in a block 1325, the computer 110 determines the historic map image 600 data at the current location of the vehicle 100. The computer 110 may be programmed to determine an image 600 from the historic map image data based on determined location coordinates of the vehicle 100 and the orientation of the vehicle 100.

Next, in a block 1330, the computer 110 determines features of the real-time image 500 and the historic map image 600 of the current location of the vehicle 100. The computer 110 may be programmed, e.g., based on a feature registration technique, to identify the features in the images 500, 600.

Next, in a block 1335, the computer 110 performs homography on identified features of the real-time image 500 and the historic map image 600 of the current location and orientation of the vehicle 100. The computer 110 may be programmed to identify features of real-time image 500 that can be mapped through a perspective transformation to feature identified in the historic map image 600.

Next, in a block 1340, the computer 110 identifies a matched portion 1000 of the real-time and historic map images 500, 600. The computer 110 may be programmed to identify the portion 1100 of the image 500 that is included in the historic map image 600. In other words, the computer 110 may be programmed to exclude portions of the image 500 that include feature which lack a perspective transformation to a feature of the historic map image 600 based on the performed homography.

Next, in a block 1345, the computer 110 identifies static features of the historic map image 600 and generates a matched portion 1100 with static features. In one example, the computer 110 may be programmed to identify the static features of the image 600 based on classification data stored in the historic map image 600 data. Additionally or alternatively, the computer 110 may be programmed to classify the features of the historic map image 600 based on an image processing technique.

Next, in a block 1350, the computer 110 classifies features of the real-time image. The computer 110 may be programmed to identify a class and/or sub-class of features based on a table of class types such as Table 1. The computer 110 may be programmed to store the class and/or sub-class of each feature based on the location of the feature in the image 600, e.g., location coordinates x", y" with reference to X", Y" axes 320, 330. In one example, the computer 110 may be programmed to perform classification of features only in portions of the image 500, in which static features are located (based on the matching location of static features identified in the historic map image 600).

Next, in a block 1355, the computer 110 determines a discrepancy. The computer 110 may be programmed to determine false positive and true positive classifications of static features, and to determine local discrepancy values and global discrepancy values based on the identified true classifications and misclassifications.

Next, in a decision block 1360, the computer 110 determines whether the discrepancy exceeds a threshold. In one example, the computer 110 determines whether a deviation between a true classification of features in a location on the transparency of the sensor 130 exceeds a threshold, e.g., 10%. The threshold may be determined based on a statistical analysis process, such as the Cochran-Mantel-Haenszel test or more generally conditional logistic regression, in the case of use of classification algorithms, to determine a significant difference or a difference above or below some threshold in the current and optimal sensor and logic related error rates. Additionally or alternatively, there are other methods known in the art to distinguish the performance between two classifiers. A p-value of such a method may be determined based on tradeoffs between false positive by setting the p-value too low and the risk of not cleaning a dirty sensor by setting the p-value too high. Additionally or alternatively, a repetitive statistical method may be utilized, e.g., performing a statistical method cyclically, e.g., each minute. To achieve a high confidence, e.g., 95%, that the sensor 130 surface 250 is dirty in a specified time span, e.g., 10 minutes, given performing the repetitive method every minute, the p-value per every check may be set at 0.994883%. Other confidence levels may be warranted such as in the case to avoid wasting washer fluid. Additionally or alternatively, the threshold may be determined based on a classifier accuracy or specific inter-class error, e.g., based on normal sensor 130 and algorithm performance variation when the sensor 130 surface 250 is not dirty. For example, lighting, weather patterns, class variation observed over time, and/or other factors may affect the performance variation. A threshold above this variation would be useful to differentiate natural variation from sensor dirtiness and may be set above the performance variation distribution (e.g. mean+2.5*sigma of performance variation). Additionally or alternatively, the threshold may be set based on simulated safety decrease in vehicle 100 operation. For example, simulation and/or real-world data may be used to identify test scenarios if grouping of pixels with misclassification errors at various levels (equivalent to potential thresholds) would change the vehicle 100 operation that results in changes to perception or motion planning that may be potentially detrimental to vehicle 100 operation. In one example, upon determining that based on performed test a virtual threshold of 15% is determined, then a 10% threshold may be used, assuming a 5% safety threshold. In another example, the computer 110 determines whether a difference between a local discrepancy and the global discrepancy exceeds a threshold, e.g., 10%. Additionally or alternatively, class-to-class misclassification error thresholds may be set higher or lower. For example, misclassifying a roadway as a person would lead to a more severe error than classifying a bike lane as a sidewalk which may not result in changes in vehicle 100 motion planning. If the computer 110 determines that the discrepancy exceeds the threshold, then the process 1300 proceeds to a block 1365; otherwise the process 1300 ends, or alternatively, returns to the block 1310, although not shown in FIG. 13.

In the block 1365, the computer 110 actuates a cleaning actuator 120. The computer 110 may be programmed to actuate a wiper actuator 120 and/or a spray pump actuator 120 to clean the transparency of the sensor 130, e.g., an outer surface of sensor 130 transparent cover, a lens 240, etc. Following the block 1365, the process 1300 ends, or alternatively, returns to the block 1310, although not shown in FIG. 13.

Computer-executable commands may be compiled or interpreted from computer programs created using a variety of programming languages and/or technologies, including, without limitation, and either alone or in combination, Java™, C, C++, Visual Basic, Java Script, Perl, Python, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random-access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The words "approximately" or "substantially" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A method, comprising:
   receiving historic image data including a classification from a plurality of classifications for respective points in the image data, wherein the plurality of classifications include at least one of a flat surface, a human, a vehicle, a construction, an object, or a nature class;
   identifying an occluded area on a vehicle sensor that collects real-time image data by localizing the vehicle in space;
   determining the discrepancy between the historic image data and the real-time image data from the sensor based at least in part on the classification of a point in the real-time image data and a classification of a corresponding point in the historic image data; and
   actuating a cleaning actuator based on the determined discrepancy.

2. The method of claim 1, wherein the historic image data is based on data from at least on one of a second vehicle and a second sensor of the vehicle.

3. The method of claim 1, wherein the historic image data includes 3D location coordinates.

4. The method of claim 1, wherein determining the discrepancy further includes:
   performing a perspective transformation of historic image data based on vehicle location coordinates and a vehicle orientation;
   identifying first feature points in the real-time image data and second feature points in the historic image data;
   performing a homography that includes a line-preserving projective mapping for the first and second feature points; and
   identifying a first portion of the real-time image data matching a second portion of the historic image data.

5. The method of claim 1, further comprising:
   identifying a classification of each feature in the historic image data;
   selecting static features based on the classification of the features;
   determining false positive and true positive classifications of the static features based on the real-time image data; and determine the discrepancy based on the determined true positive and false classifications and a confusion matrix including an average expected rate of misclassification for each class of features.

6. The method of claim 5, further comprising:

determining a local discrepancy value for a location on a transparency of the sensor and a global discrepancy value for the transparency; and actuating the cleaning actuator upon determining that a difference between an average of the local discrepancy and the global discrepancy exceeds a threshold.

7. The method of claim 5, wherein the static feature is a feature of at least one of a flat, construction, and object classes.

8. A system, comprising a processor and a memory, the memory storing instructions executable by the processor to:

receive historic image data including a classification from a plurality of classifications for respective points in the image data, wherein the plurality of classifications include at least one of a flat surface, a human, a vehicle, a construction, an object, or a nature class;

identify an occluded area on a vehicle sensor that collects real-time image data by localizing the vehicle in space;

determine the discrepancy between the historic image data and the real-time image data from the sensor based at least in part on the classification of a point in the real-time image data and a classification of a corresponding point in the historic image data; and actuate a cleaning actuator based on the determined discrepancy.

9. The system of claim 8, wherein the vehicle sensor includes a camera sensor, and the instructions further include instructions to identify the occluded area in an optical path of the camera sensor.

10. The system of claim 9, wherein the optical path includes at least one of a lens and a transparent exterior cover.

11. The system of claim 9, wherein the occluded area is an area in the optical path of the vehicle sensor that is covered by at least one of fog, water, smudge, dust, and scratch.

12. The system of claim 9, wherein the occluded area is an area of the optical path where an optical attribute of the optical path deviates from a specified optical property; the optical property including at least one of a focal point and a distortion.

13. A system, comprising:

a vehicle camera sensor having an optical path; and a processor programmed to:

receive historic image data including a classification from a plurality of classifications for respective points in the image data, wherein the plurality of classifications include at least one of a flat surface, a human, a vehicle, a construction, an object, or a nature class;

identify identify an occluded area on a vehicle sensor that collects real-time image data by localizing the vehicle in space;

determine determine the discrepancy between the historic image data and the real-time image data from the sensor based at lease in part on the classification of a point in the real-time image data and a classification of a corresponding point in the historic image data; and actuate a cleaning actuator based on the determined discrepancy.

14. The system of claim 13, wherein the occluded area is an area in an optical path of the vehicle sensor that is covered by at least one of fog, water, smudge, dust, and scratch.

15. The system of claim 13, wherein the occluded area is an area of the optical path where an optical attribute of the optical path deviates from a specified optical property; the optical property including at least one of a focal point and a distortion.

16. The system of claim 8, wherein the instructions further instructions to:

identifying a classification of each feature in the historic image data;

selecting static features based on the classification of the features;

determining false positive and true positive classifications of the static features based on the real-time image data; and determine the discrepancy based on the determined true positive and false classifications and a confusion matrix including an average expected rate of misclassification for each class of features.

17. The system of claim 16, wherein the instructions further include instructions to:

determine a local discrepancy value for a location on a transparency of the sensor and a global discrepancy value for the transparency; and actuate the cleaning actuator upon determining that a difference between an average of the local discrepancy and the global discrepancy exceeds a threshold.

18. The system of claim 16, wherein the static feature is a feature of at least one of a flat, construction, and object classes.

* * * * *

UNITED STATES PATENT AND TRADEMARK OFFICE
CERTIFICATE OF CORRECTION

PATENT NO. : 10,836,356 B2
APPLICATION NO. : 16/136631
DATED : November 17, 2020
INVENTOR(S) : David Michael Herman et al.

It is certified that error appears in the above-identified patent and that said Letters Patent is hereby corrected as shown below:

In the Claims

Claim 13, Line 9: replace "identify identify" with "--identify--"

Claim 13, Line 12: replace "determine determine" with "--determine--"

Claim 16, Line 26: replace "further instructions" with "--further include instructions--"

Claim 16, Line 28: replace "identifying" with "--identify--"

Claim 16, Line 30: replace "selecting" with "--select--"

Claim 16, Line 32: replace "determining" with "--determine--"

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*